UNITED STATES PATENT OFFICE.

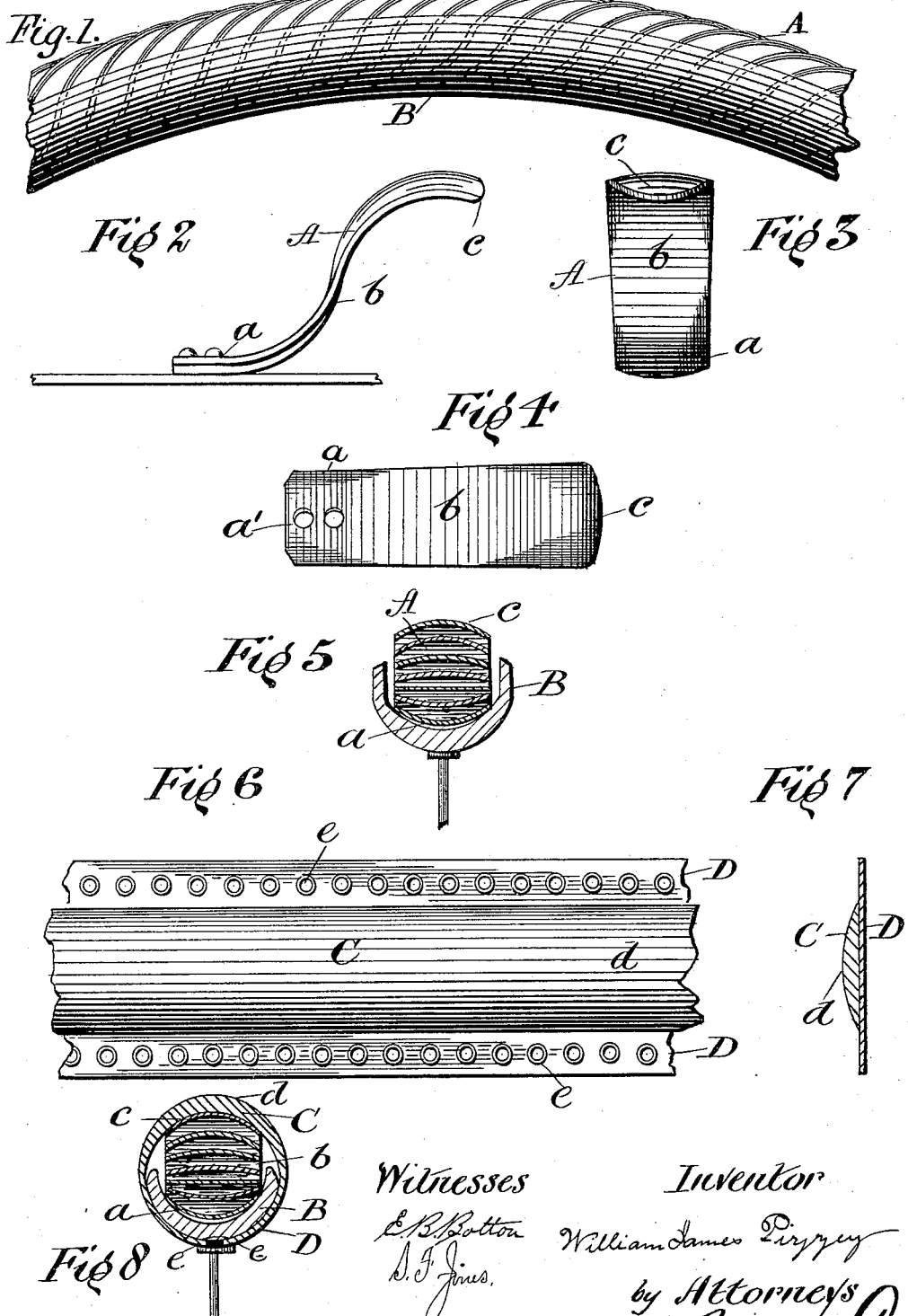

WILLIAM JAMES PIZZEY, OF BRISTOL, ENGLAND.

SPRING-RIM FOR VELOCIPEDE-WHEELS.

SPECIFICATION forming part of Letters Patent No. 480,030, dated August 2, 1892.

Application filed March 17, 1892. Serial No. 425,298. (No model.) Patented in England May 14, 1891, No. 8,249.

*To all whom it may concern:*

Be it known that I, WILLIAM JAMES PIZZEY, engineer, a subject of Her Majesty the Queen of Great Britain, and a resident of Small Street, Bristol, in the county of Gloucester, England, have invented an Improved Spring-Rim for the Wheels of Velocipedes and other Vehicles, (for which I have obtained a patent in Great Britain, No. 8,249, dated May 14, 1891,) of which the following is a specification and clear description of the same.

My invention relates to a new or improved manner of constructing the rims or wearing-surfaces of the wheels of velocipedes and other vehicles, the object of which is that a tire or wearing-surface may be provided in every way equal to and possessing all the elasticity of pneumatic or other tires of similar construction or any solid or hollow tire hitherto made and used without the necessity of abnormally-wide or otherwise specially-constructed rims or the necessary apparatus for charging with compressed air in the case of pneumatic tires or the possibility of the inconvenience arising from the bursting or cutting of the tire, as the outer casing of my said tire may be completely removed or torn away and the wheel still retain a good elastic wearing-surface.

In order that my invention may be clearly understood, I have appended hereunto a sheet of drawings, in which—

Figure 1 is a side view of part of the rim of a velocipede or other vehicle wheel fitted with a series of springs as wearing-surfaces in the manner forming the subject of my invention. Figs. 2, 3, and 4 are side view, front view, and plan, respectively, of one of the series of springs surrounding and forming the wearing-surface or tire of Fig. 1. Fig. 5 is a diametrical section of Fig. 1. Figs. 6 and 7 are plan and section, respectively, of the elastic material employed to surround Fig. 5, and shown in position by the sectional view, Fig. 8.

Similar letters of reference indicate corresponding parts throughout the drawings.

In carrying my invention into effect I construct a number of properly-tempered springs A, made from any suitable flat metal, but preferably steel, bent and fashioned after the manner shown by Figs. 2, 3, and 4—that is to say, the lower end $a$ of each is or may be slightly curved at the sides thereof, so that the under surface may be sufficiently convex to accommodate itself to the concavity of the velocipede or other wheel rim to which it is to be fixed. Said curving at $a$ gradually develops into a perfectly-flat cross-section at or about the part marked $b$, and then slightly curves in an upward direction longitudinally and assumes a lateral curve at the upper end $c$ contrary to that at $a$, the object of the latter curve $c$ being that no sharp edges may be presented to the outer covering or resilient wearing-surface when fixed thereon.

The foregoing description of the shapes of the springs A is only given approximately, as the lower or $a$ end would naturally be lessened in width, if necessary, and curved entirely to suit the particular formation of the rim of the wheel B. The lower or $a$ end of each of the said springs is furnished with one or more holes $a'$, by means of which each spring is screwed or otherwise fastened firmly within the U or other shaped rim B, as shown at Fig. 2, and arranged to slightly overlap each other, as shown in Fig. 1, until the whole of the concave rim is filled and the last spring placed in position overlapping the first. By this means the series of springs A, so placed, present a perfectly elastic surface extending slightly beyond the outer edges of B and form in themselves a perfect tire; but in order to prevent rattle and noise and guard against the deterioration of said springs by being left exposed and also to give a more finished appearance to the wheel I make use of a stout india-rubber or other resilient substance C, mounted upon canvas, cloth, leather, or any suitable material D, of a width equal to or nearly to the cross-sectional circumference of the rim B when fitted with the spring A. The resilient substance C is graduated in thickness from the center to the edges of the fabric D, upon which it is mounted, so that the center or most-exposed wearing-surface $d$ may be the thickest.

In Figs. 6 and 7 I show a plan and section of the material so prepared, upon the outer edges of which I fasten straps and buckles or insert eyelets $e$, as in Fig. 6. Said strip is in length about equal to the circumferential measurement of B, and is placed upon the wheel so that its width surrounds A and B, as at Fig. 8, and is held in position by the straps and buckles before mentioned or by means of lacing through the holes $e$ or by means of studs in lieu of eyelets or any other suitable means by which it may be held surrounding A and B.

I find in practice that the binding on or lacing of D and C should operate slightly upon the tension of the springs A for the purpose of the more symmetrical finish of the wheel and in order that each spring A may be kept in close contact with its neighbor for the further prevention of rattle.

A wheel-rim so constructed according to my invention would always present a perfectly-elastic wearing-surface equal to that of pneumatic tires without the fear of collapse that usually accompanies the use of such tires when passing over sharp stones or other substances within its path, and should at any time either of the springs A break the same can be easily replaced by the simple operation of unfastening C D and relacing or buckling same when the broken spring has been replaced by a new one.

Having now particularly described and ascertained the nature of my said invention, I declare that what I claim is—

In a spring-rim, the combination, with the rim B, of the series of springs A, curved or otherwise shaped so as to partly overlap each other, the holes $a'$, by means of which the springs are fastened to the rim B, the resilient substance C, mounted upon the material D, the substance C being graduated in thickness from the center to the edges, causing the center or exposed part $d$ to be the thickest, the holes $e$ in part D, and means engaging therewith for holding the substance C in position, substantially as set forth.

In witness whereof I have hereunto set my hand in presence of two witnesses.

WILLIAM JAMES PIZZEY.

Witnesses:
 JOHN WHEELER ALDRIDGE,
 HENRY WALDRON HOLT.